(12) United States Patent
Tipson

(10) Patent No.: US 9,841,659 B2
(45) Date of Patent: Dec. 12, 2017

(54) WEARABLE STABILIZING ASSEMBLY FOR AN OPTICAL DEVICE

(71) Applicant: Kevin Tipson, Mono (CA)

(72) Inventor: Kevin Tipson, Mono (CA)

(*) Notice: Subject to any disclaimer, the term of this patent is extended or adjusted under 35 U.S.C. 154(b) by 0 days.

(21) Appl. No.: 15/072,800

(22) Filed: Mar. 17, 2016

(65) Prior Publication Data
US 2017/0269459 A1    Sep. 21, 2017

(51) Int. Cl.
  *G03B 17/56*    (2006.01)
  *F16M 13/04*   (2006.01)
  *A45F 5/00*    (2006.01)

(52) U.S. Cl.
  CPC .............. *G03B 17/561* (2013.01); *A45F 5/00* (2013.01); *F16M 13/04* (2013.01); *A45F 2200/0533* (2013.01)

(58) Field of Classification Search
  USPC .................................................. 396/420, 423
  See application file for complete search history.

(56) References Cited

U.S. PATENT DOCUMENTS

| | | | | |
|---|---|---|---|---|
| 3,009,612 A * | 11/1961 | Fischett | ................. | A01K 97/10 224/200 |
| 5,725,136 A * | 3/1998 | Shires | .................... | F16M 13/04 224/257 |
| 6,764,231 B1 * | 7/2004 | Shubert | ................. | F16M 13/04 396/419 |
| 8,418,900 B1 * | 4/2013 | Baker | ...................... | A45F 5/00 224/262 |
| 9,335,112 B1 * | 5/2016 | Sholley | ................... | F41A 23/06 |
| 2010/0264188 A1 * | 10/2010 | Carlsson | .................. | A45F 3/14 224/576 |
| 2013/0214022 A1 * | 8/2013 | Harvey | ............... | F16M 11/041 224/623 |

* cited by examiner

*Primary Examiner* — Clayton E Laballe
*Assistant Examiner* — Linda B Smith
(74) *Attorney, Agent, or Firm* — Sand & Sebolt

(57) ABSTRACT

A stabilizing assembly for an optical device includes a base plate having a blade curved to fit against a person's torso, a strap extending outwardly from the base plate; a socket defined in the base plate and a mounting screw spaced from the socket. The blade extends below the base plate and an adjustment member is located on the underside of the base plate a distance from a lower end of the blade. The optical device is engageable with the stabilizing assembly in two ways. Firstly, the blade is inserted between the person's torso and a waistband or belt. The strap is passed around the person's neck and an end of a monopod engaged with the optical device is inserted into the socket. Secondly, the optical device is directly engaged with the mounting screw and the assembly is placed on the ground supported by the blade and adjustment member.

26 Claims, 13 Drawing Sheets

WEARABLE STABILIZING ASSEMBLY FOR AN OPTICAL DEVICE

BACKGROUND OF THE INVENTION

Technical Field

This invention is directed generally to optical equipment and accessories. More particularly, the invention is directed to stabilizing equipment for optical devices. Specifically, the invention relates to a stabilizing assembly for an optical device that includes a Background Information When a photographer holds a camera in their hands, slight movements in the photographer's body tend to be transferred to the camera causing it to shake slightly. This can affect the quality of the photographs taken using the camera in that a shaking camera will tend to blur images produced thereby. In order to reduce the tendency to transmit movement from the photographer to the camera, some photographers mount their cameras on a tripod stand. The tripod has three legs that are placed on a surface and can be adjusted so as to provide a stabilizing base for the camera. Tripods are useful for taking photographs where the subject of the photograph is not moving or for taking scenery shots. Tripods are not particularly useful when trying to take action shots such as photographing an animal that suddenly enters a location from one side or during sports when action can be from either end of a field or court. When using a tripod to take a photograph there is a need to set the camera up so that the lens is pointing toward the action and the photographer is behind the optical device. Setting the tripod in the correct location to take the best photograph can be fairly time consuming and in some instances there is not suitable surface on which to rest the tripod.

In order to address these issues a smaller type of stabilizing assembly has been developed that can be used to stabilize a camera. These smaller devices are known as monopods or unipods. The camera is engaged with a mounting at one end of the monopod's shaft and the other end of the monopod is placed on a surface to help stabilize the camera during the taking of a shot. The shaft is selectively extendable or collapsible. Typically, if the monopod is not in use the shaft would be kept in a collapsed position and would be moved to an extended position when the camera is to be used. Monopods are more useful for stabilizing a camera when the photographer is attempting to capture an action shot as the monopod and optical device engaged therewith are pivotable on the end of the monopod resting on the surface. Monopods are also more versatile in that they can be rapidly set up and rapidly moved from one surface to another. Since they don't require three points for their own stabilization, unlike tripods, they can also be used in locations where using a tripods would be difficult or near impossible. Monopods still have an issue in that they cannot easily be used to pan with the optical device through an arc of over about 90°. If the photographer is trying to pan beyond around 90° the monopod must be lifted off the support surface and repositioned so that the photographer remains behind the camera. If the photographer has the monopod in a collapsed position then when the photographer wants to take an action shot, they will need to expand the monopod's shaft and position the end thereof on a support surface before they can take a shot. While this is less time-consuming than setting up a tripod, having to extend the monopod and position the end thereof on a support surface still takes time and in the elapsed time the photographer may miss the shot.

Many other optical devices benefit from being stabilized in some form. These include binoculars, gun sights, equipment for measuring distances on golf driving ranges, etc. These optical devices may also be mounted on a tripod or monopod stabilizing assembly and may also experience the issues discussed above with respect to cameras.

SUMMARY

There is therefore a need in the art for a device for stabilizing optical device's that reduces the amount of time required to set up and stabilize the optical device so that capturing action shots is more likely.

The wearable monopod support disclosed herein solves many of the problems of prior art devices.

A stabilizing assembly for an optical device and a method of using the same is disclosed herein. The stabilizing assembly includes a base plate having a blade curved to fit against a person's torso, a strap extending outwardly from the base plate; a socket defined in the base plate and a mounting screw spaced from the socket. The blade extends below the base plate and an adjustment member is located on the underside of the base plate a distance from a lower end of the blade. The optical device is engageable with the stabilizing assembly in two ways. Firstly, the blade is inserted between the person's torso and a waistband or belt. The strap is passed around the person's neck and/or shoulder and an end of a monopod engaged with the optical device is inserted into the socket. Secondly, the optical device is directly engaged with the mounting screw and the assembly is placed on the ground supported by the blade and adjustment member.

In one aspect, the invention may provide a stabilizing assembly for an optical device comprising a base plate including a blade adapted to be held adjacent a person's body; a strap engaged with the base plate, said strap being adapted to pass around the person's neck and/or shoulder; and a first engagement member provided on the base plate; said first engagement member being adapted to selectively engage an optical device with the base plate in a first orientation.

In another aspect, the invention may provide in combination an optical device having a mounting assembly on a lower surface thereof; a monopod having a shaft with a first end and a second end; wherein the first end is engageable with the mounting assembly on the optical device; a stabilizing assembly comprising a base plate including a blade adapted to be held against a person's torso; a strap engaged with the base plate, said strap being adapted to pass around a back of the person's neck and/or shoulder; and a first engagement member provided on the base plate; wherein the second end of the monopod is engageable with the first engagement member and the base plate supports the optical device when the monopod is so engaged.

In another aspect, the invention may provide a method of stabilizing an optical device that includes a mounting assembly thereon, said method comprising providing a monopod having a shaft with a first end and a second end; providing a stabilizing assembly comprising a base plate having a curved blade at one end and a first engagement assembly located a distance from the blade; and wherein a strap extends outwardly from the base plate; engaging the first end of the monopod with the mounting assembly on the optical device; positioning the curved blade of the base plate against a person's torso; wrapping the strap around the back of the person's neck and/or shoulder; engaging the second end of the monopod with the first engagement assembly; and supporting the optical device a distance above the base plate.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
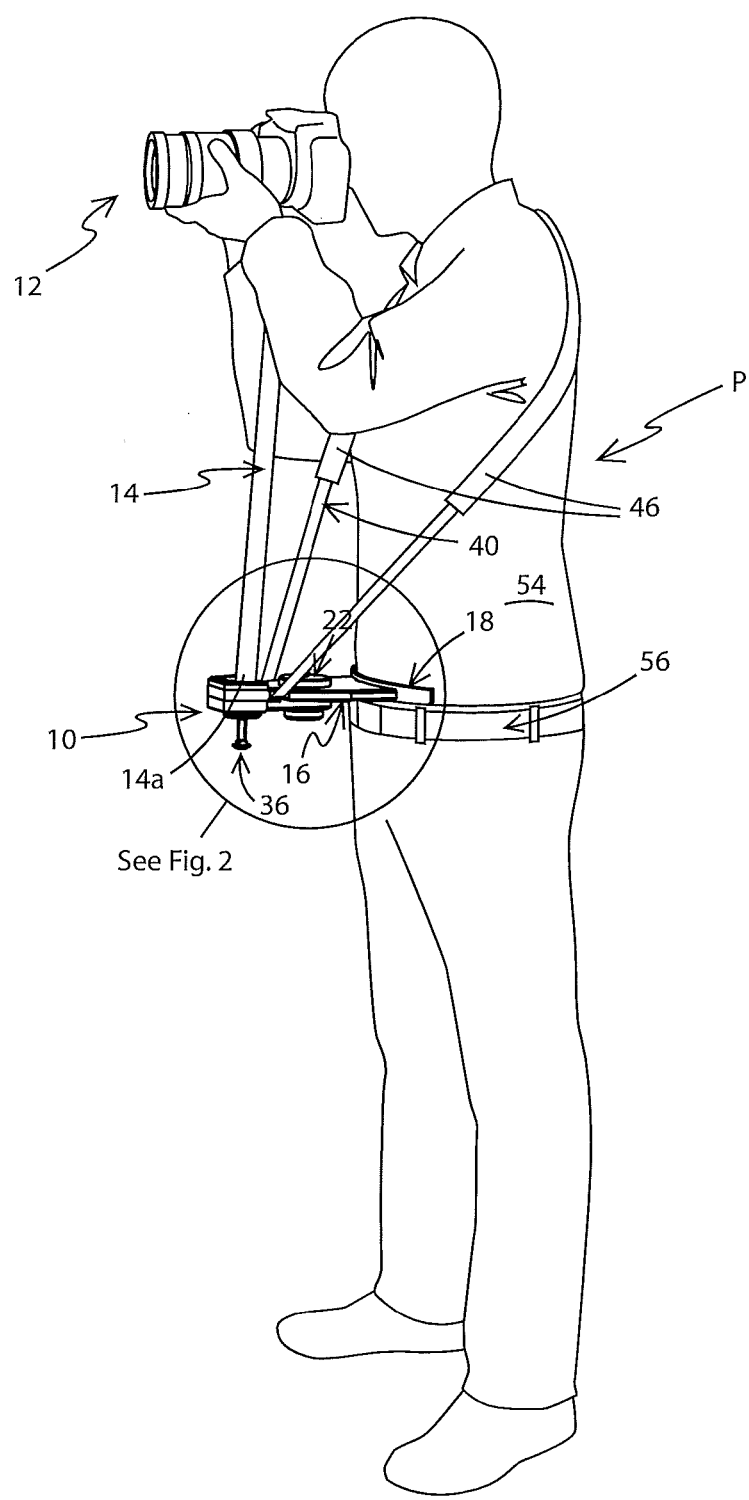
FIG. 1 is a perspective view of a photographer wearing a monopod stabilizing assembly in accordance with the present invention and showing an optical device engaged with the stabilizing assembly.

Referring to FIG. 1 there is shown a person "P" wearing the stabilizing assembly in accordance with an aspect of the present invention. The stabilizing assembly is indicated in this description by the reference number 10. Stabilizing assembly 10 is configured to be worn on the person's body and to provide a substantially stable support surface for an optical device 12. The optical device illustrated herein is a camera but it will be understood that a wide variety of optical devices that could benefit from stabilizing during use could individually be engaged with stabilizing assembly 10 and the camera is merely representative of that variety of optical devices. The optical device 12 illustrated in FIG. 1 is selectively engaged with stabilizing assembly 10 via a monopod 14. Optical device 12 is illustrated as being held in a first orientation relative to stabilizing assembly 10 in FIG. 1.

Figure 12:
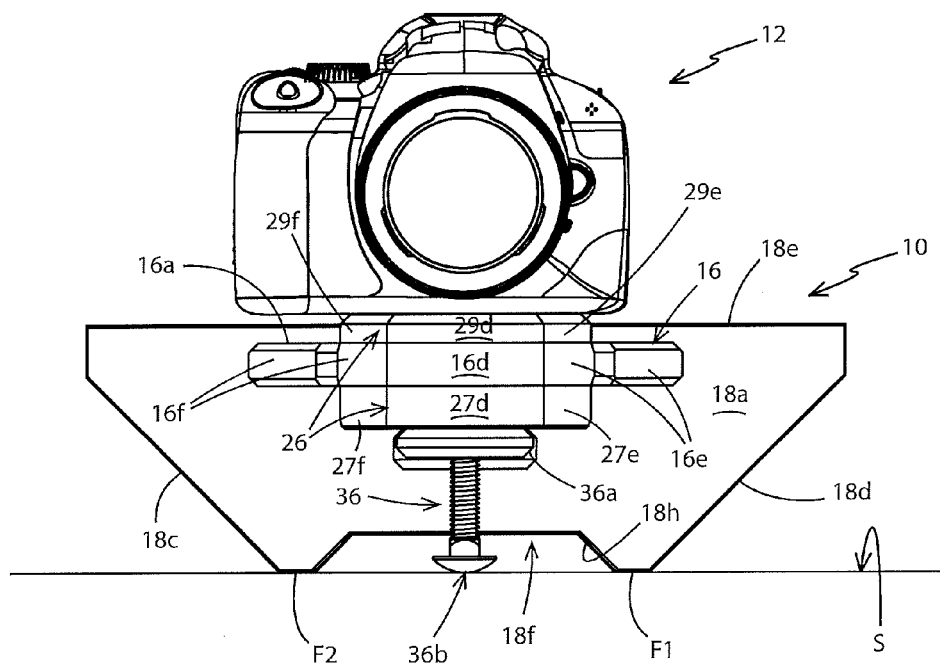
FIG. 12 is a front view of an optical device mounted on the stabilizing assembly and showing the stabilizing assembly in the collapsed position.
Figure 13:
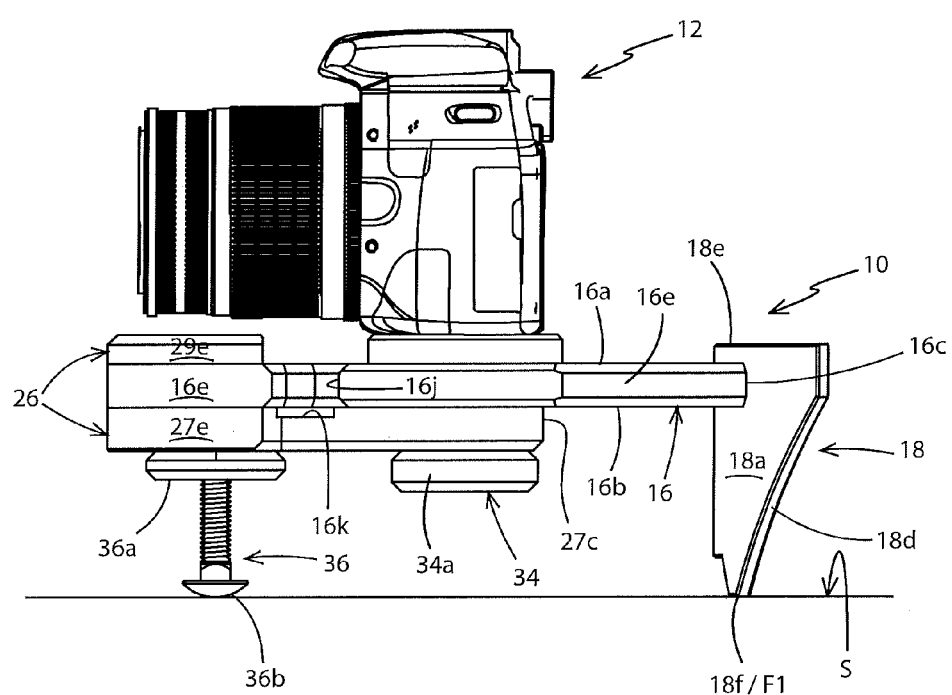
FIG. 13 is a side view of the optical device mounted on the stabilizing assembly when the stabilizing assembly is in the collapsed position.

Alternatively, as will be later described herein, optical device 12 may be directly engaged with stabilizing assembly 10 as illustrated in FIG. 12 and without the use of monopod 14. Once optical device 12 and is directly engaged with stabilizing assembly 10 the stabilizing assembly may be placed on a surface "S" (as opposed to being retained on the person's body). Surface "S" may be a ground surface, a rock, a wall, or any other flat or almost flat surface upon which a person wishes to support and stabilize optical device 12. In FIG. 12, optical device 12 is illustrated as being held in a second orientation by stabilizing assembly 10 while stabilizing assembly 10 is itself placed on surface "S".

Optical device 12 may be any type of optical device that is better operated if kept from wobbling around or shaking during use because of movement of the operator's hands. Optical device 12 may therefore include but is not limited to a camera, binoculars, a gunsight, or an optical distance-measuring device. Engaging optical device 12 with stabilizing assembly 10 aids in damping/stopping or substantially damping or stopping a wobbling or shaking motion of optical device 12. This damping of possible movement by stabilizing assembly 10 helps ensure that if a camera is the optical device 12 engaged therewith, then photographs taken using that camera are focused and crisp instead of being slightly blurred. If binoculars or a gunsight or distance-measuring device are engaged with stabilizing assembly 10, then the assembly 10 helps ensure that an operator looking through that optical device will be able to see a distant image more clearly than if the stabilizing assembly 10 was not used.

Referring to FIGS. 2-11, stabilizing assembly 10 may be fabricated out of plastic or any other suitable material. Stabilizer assembly 10 may be fabricated of plastic that is computer numerical control (CNC) machined or may be molded, cast or otherwise fabricated from Acrylonitrile-Butadiene-Styrene (ABS) plastic, polycarbonate plastic or any other plastic. Other materials such as die-cast aluminum could be utilized instead to fabricate stabilizing assembly 10 or parts thereof.

Stabilizing assembly 10 includes a base plate 16 having a first surface 16a, a second surface 16b (FIG. 2), a first end 16c, a second end 16d, a first side 16e, and a second side 16f. First and second surfaces 16a, 16b are opposing surfaces and first surface 16a generally faces upwardly toward optical device when stabilizing assembly 10 is worn on the person's body or is placed on surface "S". Base plate 16 has a longitudinal axis "Y" (FIG. 5) that extends between first end 16c and second end 16d. First end 16c of base has a width "W1" (FIG. 5) measured between the first side 16e and the second side 16f. As is evident from FIG. 5, the first end 16c is the widest portion of base plate 16 and the width "W1" is the width of this widest portion of base plate 16.

Figure 3:
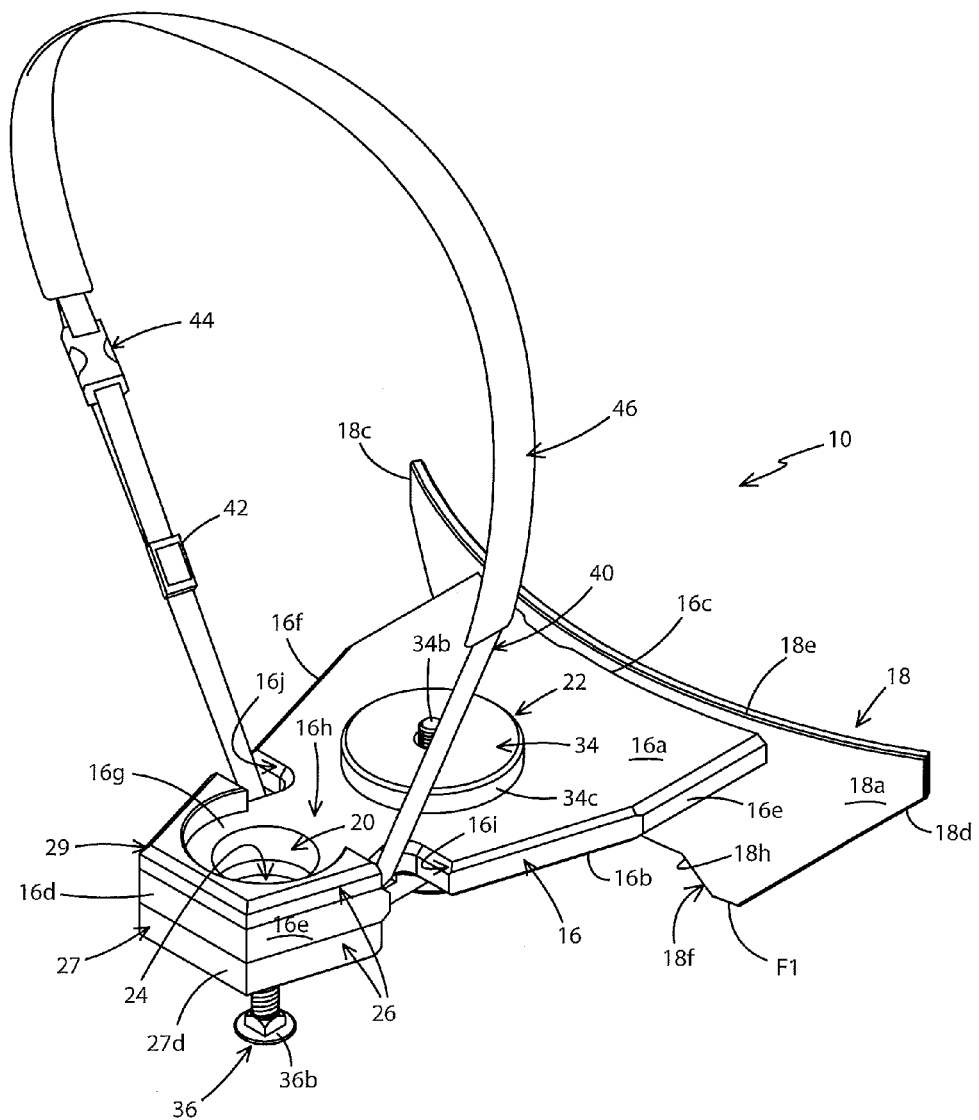
FIG. 3 is a front perspective view of the stabilizing assembly shown removed from the photographer's body.
Figure 4:
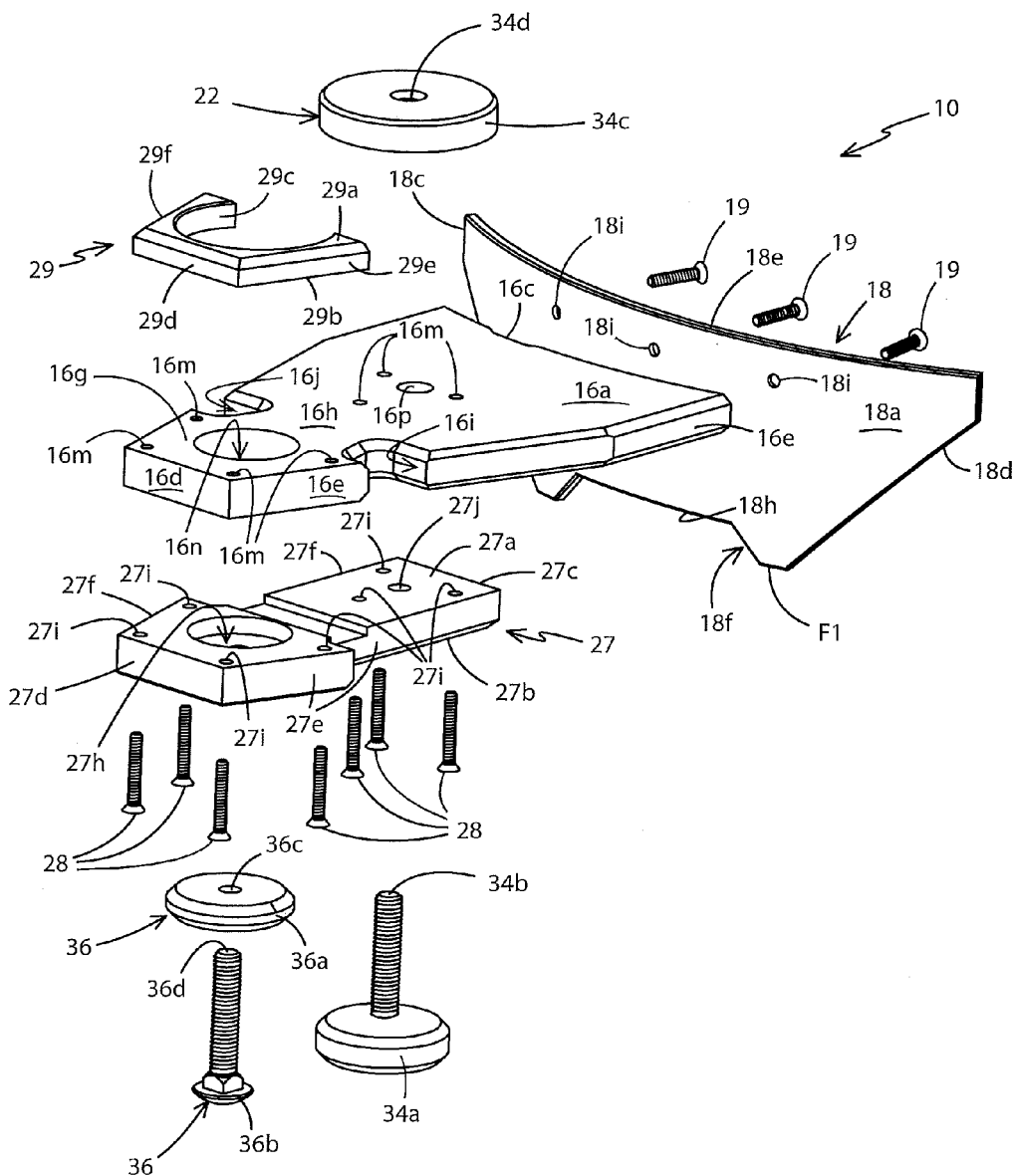
FIG. 4 is an exploded perspective view of the stabilizing assembly.
Figure 5:
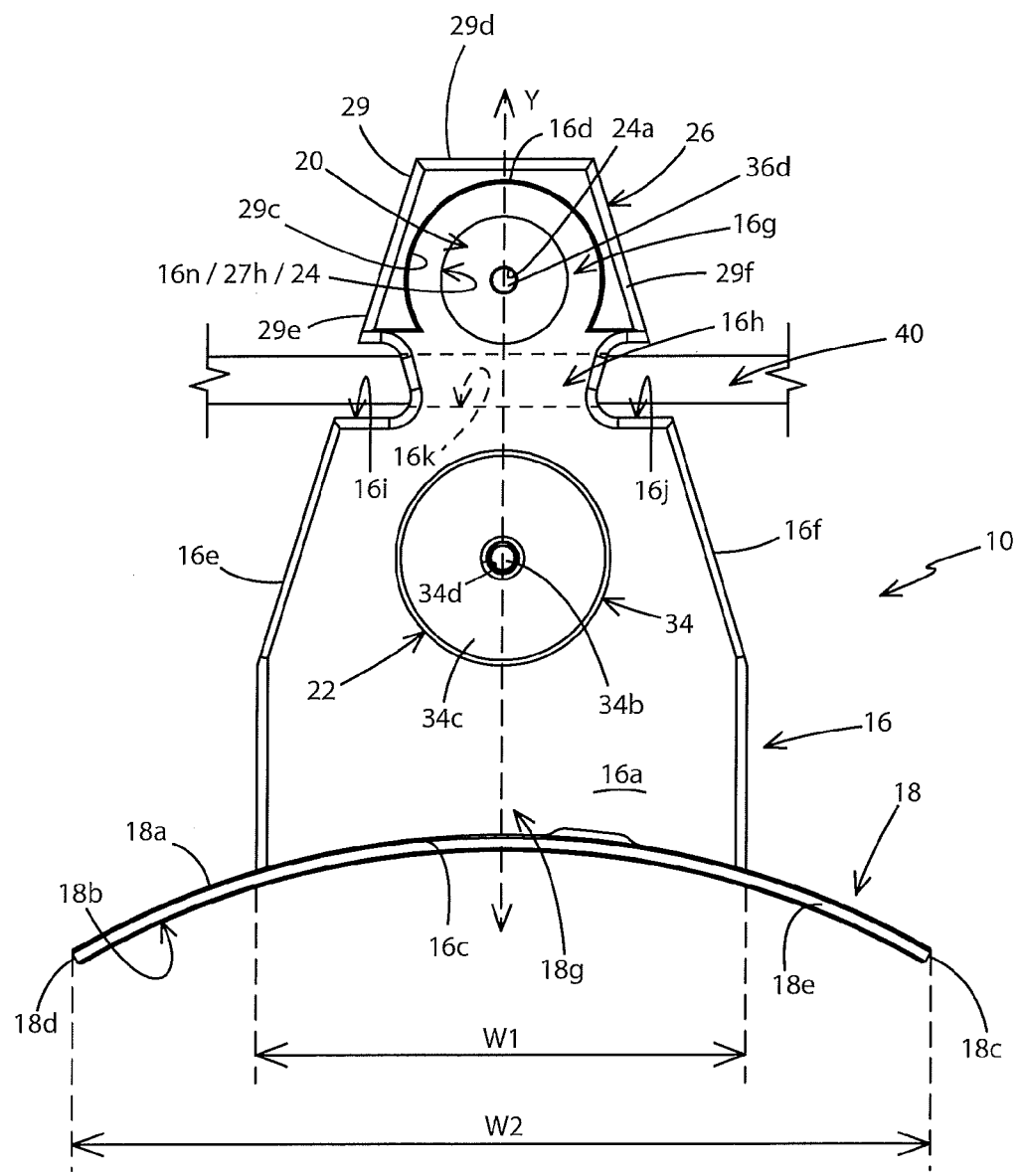
FIG. 5 is a top view of the stabilizing assembly.
Figure 6:
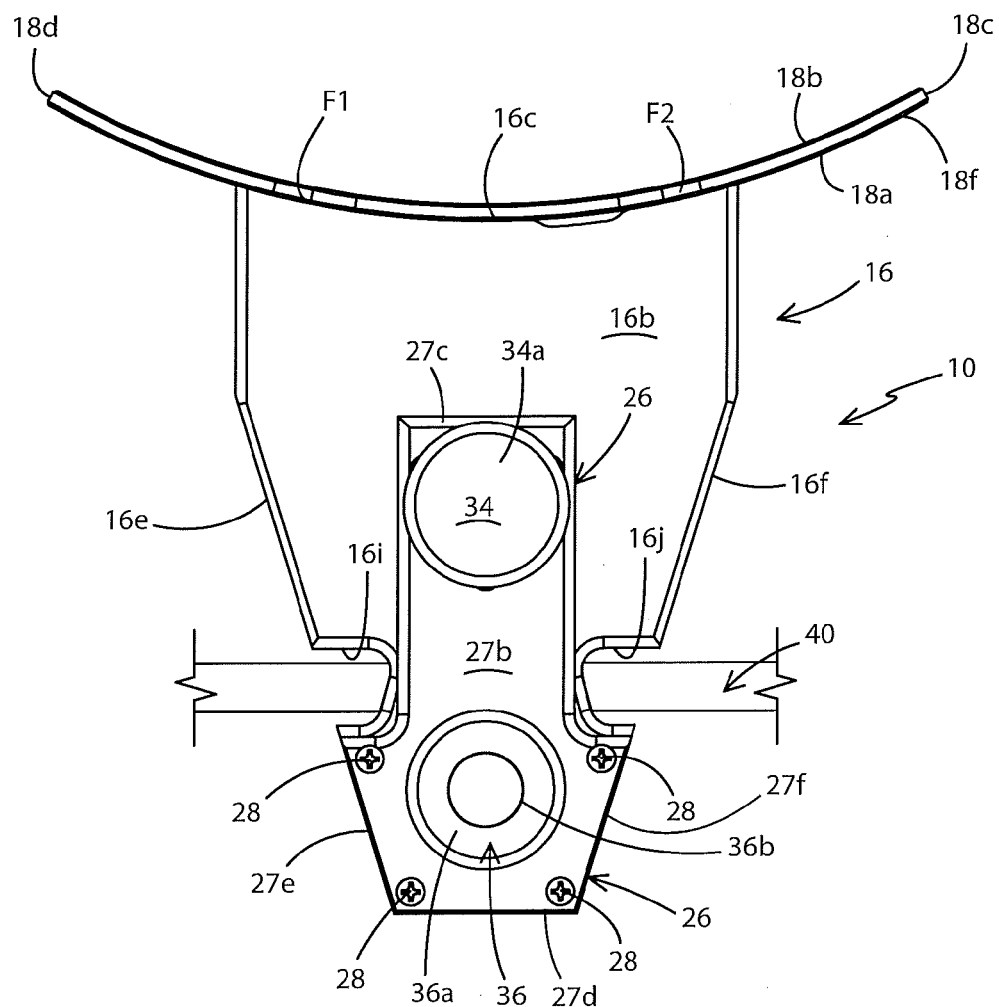
FIG. 6 is a bottom view of the stabilizing assembly.
Figure 7:
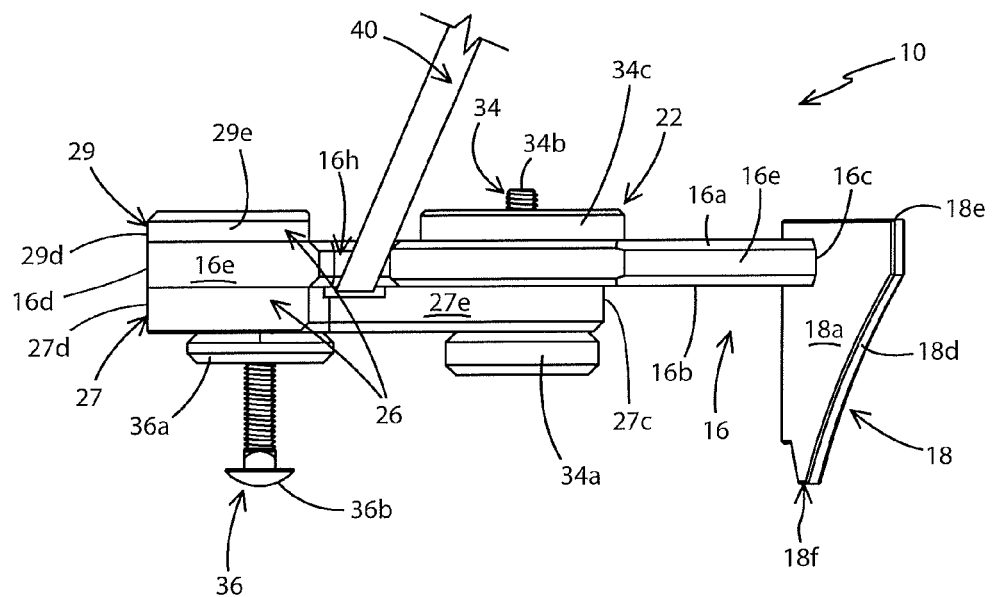
FIG. 7 is a right side view of the stabilizing assembly.

Referring to FIGS. 3-5, the region of base plate 16 that includes second end 16c is narrower than the region that includes first end 16d. This narrower region of base plate 16 is indicated as region 16g. A neck 16h connects the narrower region 16g to the rest of base plate 16. A notch 16i is defined in first side 16e and a notch 16j is defined in second side 16f. The notches 16i, 16j are located on either side of neck 16h. A plurality of through-holes 16m is defined in base plate 16 and each through-hole 16m extends between first and second surfaces 16a and 16b. Base plate 16 also defines a first aperture 16n in region 16g that is generally centrally located in region 16g. A second aperture 16p is defined in the base plate 16 between neck 16h and first end 16c. Second aperture 16p also extends between first surface 16a and second surface 16b.

A blade 18 is provided at first end 16c of base plate 16. Blade has an interior surface 18a, an exterior surface 18b (FIG. 5), a first end 18c, a second end 18d, a top 18e, and a bottom 18f. Blade 18 defines a plurality of through-holes 18i therein and each through-hole 18i extends between interior and exterior surfaces 18a, 18b. A fastener 19 is inserted through each hole 18*i* to secure blade 18 to first end 16*c* of base plate 16. (Although not illustrated in any of the figures it will be understood that first end 16*c* of base plate 16 defines holes therein that align with each hole 18*i* in blade 18 and into which each fastener 19 is engaged.) Blade 18 is oriented substantially at right angles to longitudinal axis "Y" when engaged with base plate 16. Blade 18 has a width "W2" (FIG. 5) measured between first end 18*c* and second end 18*d*. Width "W2" of blade 18 is greater than width "W1" of base plate 16.

Figure 2:
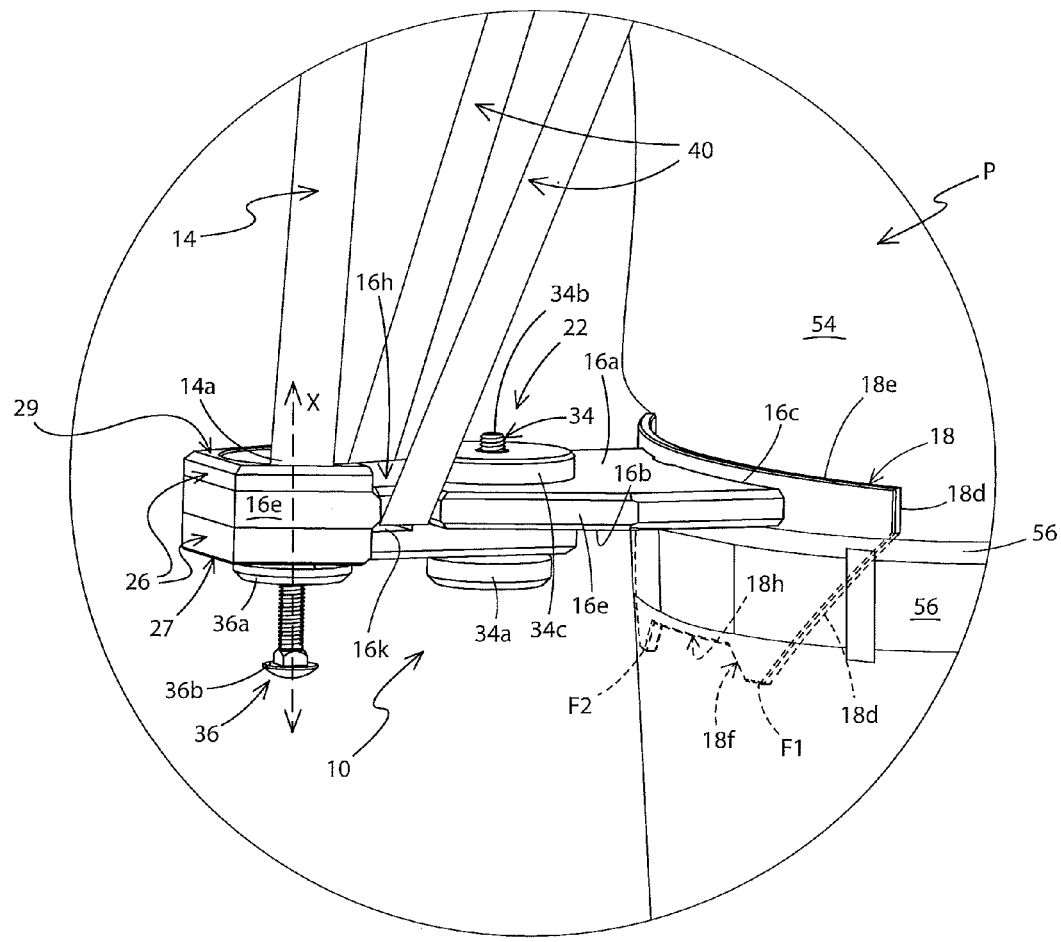
FIG. 2 is an enlarged perspective view of the highlighted region of FIG. 1.

FIGS. 2 and 4 show that first end 18*c* of blade 18 is located a distance laterally outwardly beyond second side 16*f* of base plate 16 and second end 18*d* of blade 18 is located a distance laterally outwardly beyond first side 16*e* of base plate. A middle region of blade 18 is located generally in a middle region of base plate 16; where the middle region of the base plate 16 is generally equidistant from each of first and second sides 16*e*, 16*f*. Blade 18 is curved in such a way that the first end 18*c* and second end 18*d* are located further from second end 16*d* of base plate 16 than is the middle region of the blade 18. The middle region of blade 18 is indicated on FIG. 5 by the reference number 18*g*. Blade 18 is thus concavely curved with respect to its orientation on base plate 16. The curvature of blade 18 is such that a portion of the person's torso will contact exterior surface 18*b* of blade 18 when stabilizer assembly 10 is worn as illustrated in FIG. 1. Blade 18 is thus able to anatomically fit a generally average person's waistline.

Figure 8:
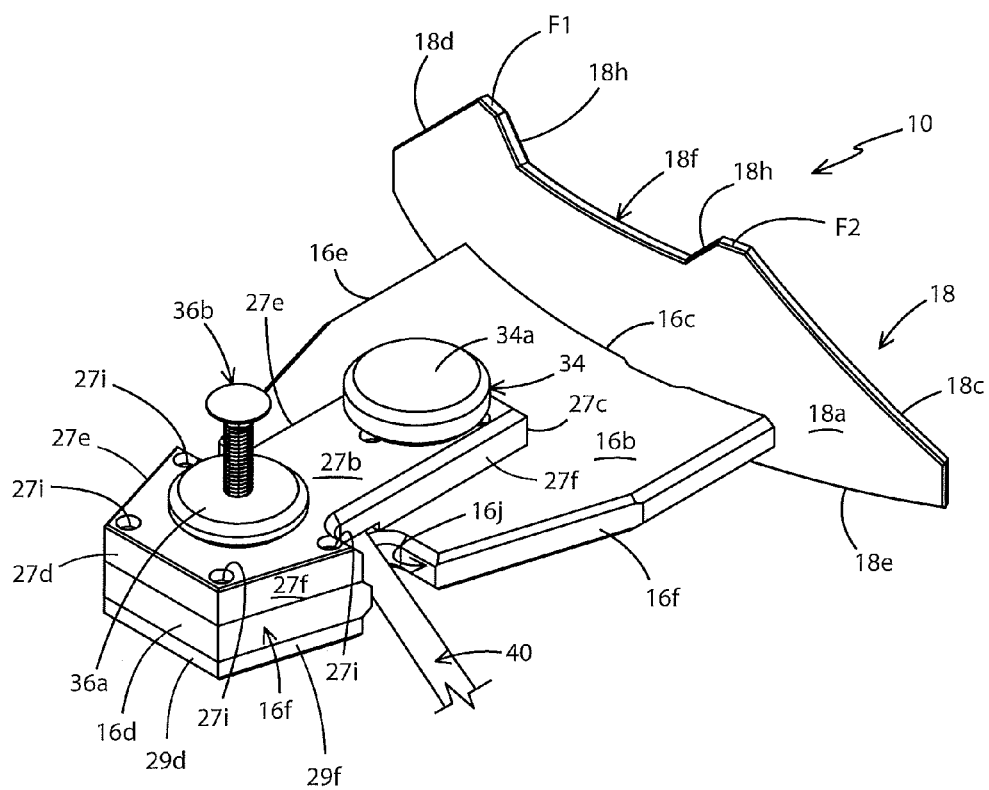
FIG. 8 is a perspective view of a bottom of the stabilizing assembly showing a first embodiment of an adjustment assembly on the base plate.

FIGS. 2 and 4 show that blade 18 includes a first region that extends upwardly beyond first surface 16*a* and a second region that extends downwardly below second surface 16*b*. The second region of blade 18 is substantially larger than the first region thereof. First and second sides 18*c*, 18*d* of blade 18 initially extend downwardly from top 18*e* and generally at right angles thereto. A distance downwardly from top 18*e*, each of the first and second sides 18*c*, 18*d* angle inwardly and downwardly towards bottom 18*f*. Blade 18 is thus tapered from top 18*e* to bottom 18*f* as can be seen in FIG. 8. A notch 18*h* is defined in bottom 18*f* of blade 18 and this notch effectively creates two feet in bottom 18*f*. These feet are indicated by the reference characters F1 and F2.

Stabilizer assembly 10 further includes a guide wall 26 that is engaged with base plate 16. Guide wall 26 comprises a first section 27 and a second section 29. First section 27 is positionable adjacent second surface 16*b* of base plate and second section 29 is positionable adjacent first surface 16*a*. First section 27 has an interior surface 27*a*, an exterior surface 27*b*, a first end 27*c*, a second end 27*d*, a first side 27*e*, and a second side 27*f*. An end of first section 27 that includes second end 27*d* is shaped to be substantially complementary to region 16*g* of base plate and is configured to be placed adjacent thereto. A plurality of through-holes 28 is defined in first section 27 and each through hole 28 extends between interior surface 27*a* and exterior surface 27*b*. Holes 28 are positioned to align with holes 16*m* in base plate 16 when interior surface 27*a* of guide wall 26 is located adjacent second surface 16*b* of base plate 16. A groove 27*g* is defined in interior surface 27*a* of first section 27. Groove 27*g* extends from first side 27*e* through to second side 27*f*. When first section 27 is positioned adjacent second surface 16*b* of base plate 16, then groove 27*g* together with second surface 16*b* defines a channel 16*k* that extends between first side 16*e* and second side 16*f* of base plate 16. The purpose of channel 16*k* will be discussed later herein.

First section 27 also defines a recess 27*h* in the region of first section 27 that is to be positioned adjacent region 16*g* of base plate 16. Recess 27*h* is positioned to align with aperture 16*n* in base plate 16. First section 27 also defines a through-hole 27*j* therein and which extends between interior surface 27*a* and exterior surface 27*b*. Hole 27*j* is positioned to align with hole 16*p* in base plate 16.

Second section 29 of guide wall 26 is a generally C-shaped component that has a first surface 29*a*, a second surface 29*b*, a first end 29*c*, a second end 29*d*, a first side 29*e*, and a second side 29*f*. First side 29*e* is generally C-shaped. Second end 29*d* and first and second sides 29*e*, 29*f* are of a similar configuration to the region 16*g* of base plate 16 that includes second end 16*d* and part of side walls 16*e*, 16*f*; and which terminates at notches 16*i*, 16*j*. Second surface 29*b* is positioned adjacent first surface 16*a* of base plate 16 and so that first end 29*c* at least partially surrounds aperture 19. As illustrated in the figures, the surfaces of base plate 16 and second section 29 that face upwardly toward optical device 12 may be beveled or curved so that the stabilizing assembly 10 presents few sharp edges that might be contacted during use. The edges of the lower surfaces of base plate 16 and guide wall 26 may be similarly beveled and for the same reason.

First section 27 of guide wall 26 may define a plurality of apertures 27*i* therein and these apertures 27*i* are positioned to align with holes 16*m* on region 16*g* of base plate 16. Although not illustrated herein it will be understood that second surface 29*b* of second section 29 of guide wall 26 also defines holes therein that will be located to align with holes 16*m* in region 16*g* and thereby with some of the apertures 27*i* in first section 27 of guide wall 26. Fasteners 28 are inserted through the aligned holes 27*i*, 16*m* and those holes in second section 29 in order to secure guide wall 26 and base plate 16 together.

In accordance with an aspect of the present invention, stabilizer assembly 10 may be provided with a first engagement member 20 or a second engagement member 22 or both of the first engagement member 20 and a second engagement member 22. It is the latter version that is illustrated in the attached figures. First engagement member 20 is configured to allow a monopod engaged with optical device 12 to be used to engage optical device 12 to stabilizing assembly 10 and to hold optical device 12 in the first orientation relative thereto. Second engagement member 22 is configured to allow optical device 12 to be directly secured to stabilizing assembly and to be held in a second orientation relative thereto. Providing both of the first and second engagement members 20, 22 on stabilizing assembly 10 allows optical device 12 to be engaged with assembly 10 either of the first and second orientations.

First engagement member 20 may comprise a socket 24 that is formed by the aligned aperture 16*n* in base plate 16 and hole 27*h* in guide wall 26. Socket 24 tapers inwardly from first surface 16*a* of base plate 16 toward exterior surface 27*b* of guide wall 26 so that socket 24 may progressively become of a smaller circumference the further one gets from first surface 16*a* of base plate 16. The innermost central region of socket 24 may comprise the deepest narrowest circumferential portion of socket 24. This deepest central region may defines an aperture 24*a* (FIG. 5) therein. The overall shape of socket 24 is substantially complementary to an end 14*a* of monopod 14 and end 14*a* of monopod 14 is configured to be received and seated within socket 24. Socket 24 may be fabricated to have any desired shape and end 14*a* of monopod 14 will be similarly configured. Second section 29 of guide wall 26 may at least partially surround socket 24 so that if end 14*a* of monopod 14 slips out of socket 24, the monopod 14 may be substantially prevented from sliding off stabilizing assembly 10 by second section 29.

Second engagement member 22 may comprise a mounting screw 34 that may be located approximately in a middle region of base plate 16. Mounting screw 34 includes a head 34a and a threaded shaft 34b. Shaft 34b is inserted through hole 27j defined in guide wall 26 and through the aligned hole 16p defined in base plate 16. Shaft 34 is inserted from the side of second surface 16b through holes 27j and 16p and so that a length of shaft 34b extends outwardly beyond first surface 16a. A fastener disc 34c is provided and disc 34c defines a through-hole 34d therein. The portion of shaft 34b extending beyond first surface 16a is inserted into hole 34d in fastener disc 34c. Shaft 34b is engaged with disc 34c to substantially prevent shaft 34b from disengaging from guide wall 26 and base plate 16. When engaged, head 34a of mounting screw 34 is positioned adjacent exterior surface 27b of guide wall 26. The purpose of mounting screw 34 will be described later herein.

Stabilizing assembly 10 may be provided with an adjustment assembly that may be used to tilt base plate 16 relative to a surface "S" or to level base plate 16 relative to surface "S". In a first embodiment, illustrated in FIGS. 1-8, 12 and 13, the adjustment assembly may comprise a threaded fastener 36 that comprises a locking disc 36a and a bolt 36b. Locking disc 36a defines an aperture 36c (FIG. 4) therein. Bolt 36b includes a head and a threaded shaft. The end of the shaft of bolt 36b is inserted through aperture 36c in disc 36a and then into hole 24a defined in the bottom of socket 24 in guide wall 26. Fastener 36 is selectively rotatable about an axis "X" (FIG. 2) in a first direction to move the head of bolt 36b away from disc 36a and thereby away from second surface 16b of base plate 16. Fastener 36 may alternatively be rotated about axis "X" in a second direction to move the head of bolt 36b toward disc 36a and thereby toward second surface 16b of base plate 16. Disc 36a acts as a lock nut to secure bolt 36b in any particular position relative to guide wall 26 and base plate 16. When stabilizing assembly 10 is rested on surface "S", assembly 10 is supported by three-points, namely feet F1, F2 and the head of bolt 36b.

Figure 9:
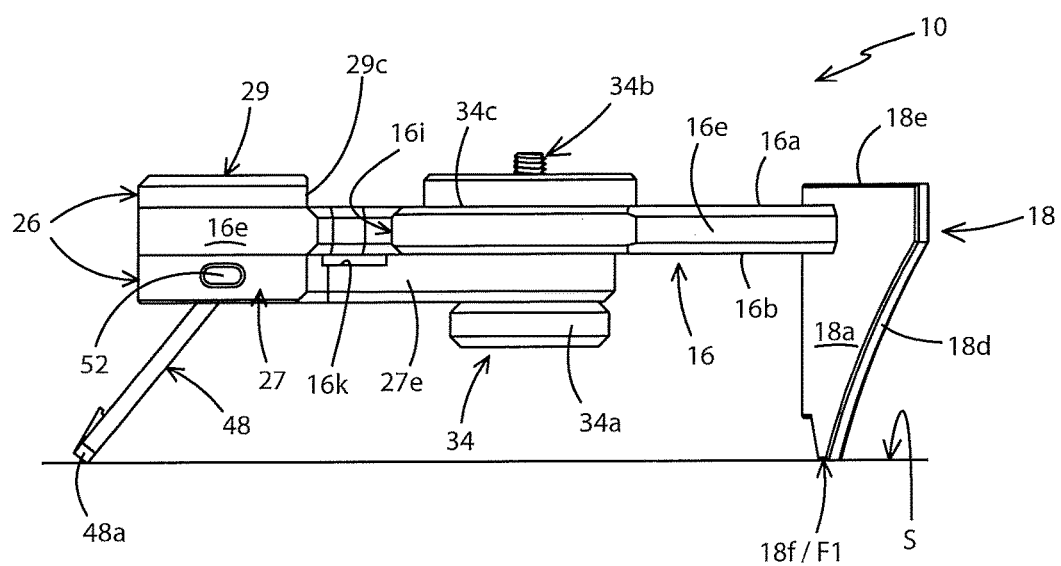
FIG. 9 is a side view of the stabilizing assembly with a second embodiment of an adjustment assembly on the base plate; where the adjustment assembly includes a leg pivoted to a first position relative to the base plate.
Figure 10:
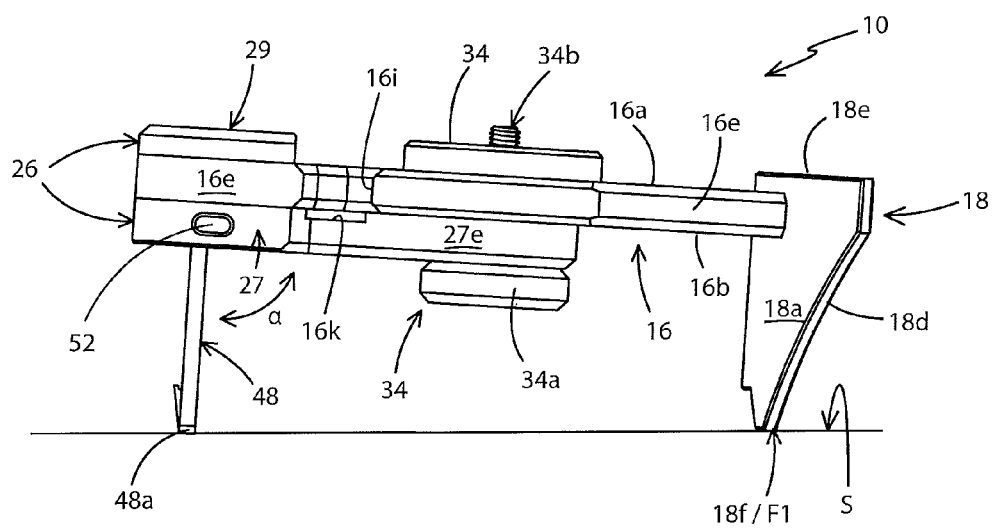
FIG. 10 is a side view of the stabilizing assembly with the leg pivoted to a second position.
Figure 11:
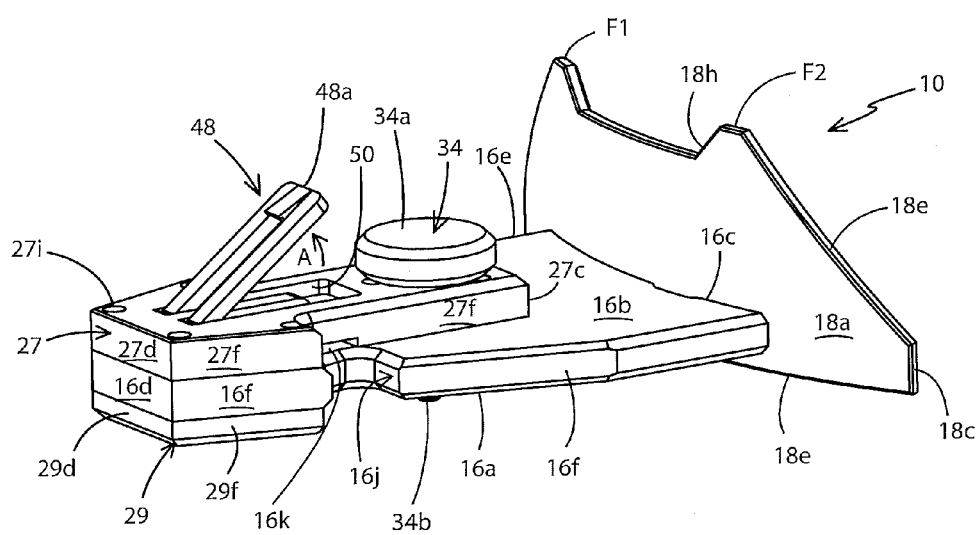
FIG. 11 is a bottom perspective view showing the leg pivoted to a third position.

A second embodiment of the adjustment assembly is illustrated in FIGS. 9-11. This second embodiment may include a leg 48 that is selectively positionable to extend below second surface 16b of base plate 16 and exterior surface 27b of guide wall 26 in order to angle/tilt base plate 16 relative to surface "S" or to level base plate 16 relative to ground surface "S". Leg 48 may be pivotally engaged with guide wall 26 and is pivotable out of alignment therewith from a collapsed position to an extended position. In the collapsed position, leg 48 is received within a complementary cavity 50 defined in guide wall 26 and may be substantially parallel to base plate 16. To move leg 48 from the collapsed position to the extended position, leg 48 is rotated about an axis extending along a pivot rod that secures leg 48 to stabilizing assembly 10, particularly guide wall 26 or possibly base plate 16. A locking mechanism is engaged with leg 48 and this locking mechanism is engaged with guide wall 26 or base plate 16 and operated, i.e., activated and deactivated, by way of a button 52 provided on guide wall 26 (or base plate 16). Button 52 is depressed inwardly to disengage the locking mechanism so that leg 48 is able to pivot. When button 52 is released, locking mechanism will re-engage and lock leg 48 in whatever orientation it is at when button 52 is released. Button 52 is operatively engaged with the locking mechanism associated with leg 48. When button 52 is depressed, the person may grasp the end 48a of leg 48 and rotate leg 48 in the direction of arrow "A" (FIG. 11) to rotate leg 48 from the collapsed position (where leg 48 is generally coplanar with guide wall 27) to an extended position (where leg 48 is oriented at an angle α (FIG. 9) relative to guide wall 27.

Person "P" is able to select how large angle α should be for any particular circumstance. So, for example, in FIG. 9, angle α is greater than 90°, possible around 120°, relative to guide wall 27, while in FIG. 10, angle α approximates 90° relative to guide wall 27. The changes in the angle α can be easily adjusted by depressing button 52 and rotating leg 48. When leg 48 is no longer needed the person "P" will depress the button 52 and push leg 48 in the opposite direction to arrow "A" and back into cavity 50 where leg 48 will once again be flush with the lowermost surface of guide wall 27.

Either of the adjustment assemblies 36, 48 may be utilized to position stabilizing assembly 10 on a surface "5", such as on the ground. For close-up, more detailed photography, the person "P" may select to not wear stabilizing assembly 10 but, instead, position stabilizing assembly 10 on surface "5". Adjustment assembly 36 or 48, whichever is provided on device 10, may be utilized to level or tilt base plate 16 relative to surface "S". In the case of threaded fastener 36, the screw will be selectively rotated in a first direction about axis "X" to move the head 36b thereof further from guide plate 26 if it is desired to raise the end of base plate 16 that includes socket 24 relative to surface "S" (spaced-apart feet "F1" and "F2" of blade 18 and head 36b of threaded fastener 36 will rest upon surface "S".) The screw of threaded fastener 36 will be rotated in the opposite direction if it is desired to lower the end of base plate 16 that includes socket 24 towards surface "S". If stabilizing assembly 10 includes leg 48, that leg 48 will be set at any desired angle relative to base plate 16 so that base plate 16 will be oriented in the desired manner when end 48a of leg 48 and the two feet F1 and F2 of blade 18 are placed on surface "S". The provision of the adjustment assembly (36 or 48 or any other suitable adjustment mechanism) allows for positioning of stabilizing assembly 10 on surface "S" in such a manner that allows for camera stability; even on uneven ground. In this instance, optical device 12 (i.e., camera and any existing panning or tilting devices engaged therewith) are mounted to base plate 16 via mounting screw 34. When used in this manner the optical device 12 sits lower to the ground ("S") than if the same equipment was mounted to a tripod, allowing for unique and sometimes desirable or necessary perspectives on the subject being photographed.

A strap 40 is threaded through channel 16k defined between base plate 16 and guide wall 26. Strap 40 may be fabricated from a durable material such as nylon and is of a sufficient length to pass around the back of the person's neck and/or the person's shoulder. Strap 40 may be of a type that may be adjustable in length and therefore include an adjustment buckle 42. Strap 40 may further be fabricated in two sections that are fastened together by way of a snap-buckle assembly 44. As illustrated in FIG. 1, padding 46 may also be applied to strap 40 to make it more comfortable to wear. Additionally, at least the portion of strap 40 which passes around the person's neck and/or shoulder may be wider than the part of the strap which passes through channel 16k in base plate 16. The wider part of the strap 40 also makes it more comfortable to wear around the neck or shoulder.

In accordance with an aspect of the stabilizing assembly 10, lower region of blade 18 (i.e., that portion which extends below second surface of base plate 16) may be inserted between the person's shirt 54 and waistband/belt 56. (It will be understood that the waistband 56 may be provided on a skirt instead of a pair of pants and that the belt 56 may be provided on a skirt or dress.) When blade 18 is inserted in this manner, second surface of base plate 16 proximate the first end 16*c* thereof, is positioned proximate an upper edge of the waistband/belt 56 and base plate 16 extends substantially horizontally outwardly from the person's torso. Snap-buckle assembly 44 is disengaged; strap 40 is passed around the back of the person's neck and/or shoulder; and then snap-buckle assembly 44 is re-engaged to fasten strap sections back together. Any slack in strap 40 is taken up by repositioning the buckle 42 along strap 40. The positioning of strap 40 in this manner causes at least some of the strap 40 to rest on the top of the person's shoulders and back. Base plate 16 is thus held in a substantially stable horizontal position, ready for engagement of the monopod 14 and optical device 12 therewith. With monopod 14 in a semi-collapsed position (i.e., some of the shaft thereof partially extended), the bottom end 14*a* (FIG. 2) of the shaft is inserted into socket 24 on base plate 16. Because of the shape and depth of socket 24 and the complementary angle between bottom end 14*a* and socket 24, the shaft of monopod 14 is received in and becomes seated in socket 24. Second leg 29 of guide wall aids in guiding the bottom end 14*a* into socket 24 and substantially prevents bottom end 14*a* from accidentally slipping out of socket 24. The positioning of bottom end 14*a* of monopod 14 in socket 24 supports optical device 12 and enables the person "P" to easily spin the optical device 12 around through about 180°. The photograph "P" can therefore more readily manipulate optical device on monopod 14 in order to capture a shot from behind or is able to pan a moving image such as a car race to any extent without having to set up or reposition monopod 14 or moving a ground-supported tripod or monopod. This allows for much faster speeds of taking photographs using a camera, if the optical device 12 is a camera than was previously possible with monopods and tripods. Using stabilizing assembly 10 in this manner is therefore more likely for a photographer to successfully capture a shot while on the move.

Stabilizing assembly 10 is contemplated to be used by persons seated in a wheelchair giving them more freedom to use equipment that might otherwise not be possible for them to use because of the set up involved. Stabilizing assembly 10 may also be used by hunters to support a spotting scope or even a rifle mounted on a monopod.

A method of stabilizing an optical device 12 having a mounting assembly thereon includes the steps of providing a monopod 14 having a shaft with a first end and a second end; providing a stabilizing assembly 10 comprising a base plate 16 having a curved blade 18 at one end 16*c* and a first engagement assembly 20 located a distance from blade 18; and wherein a strap 40 extends outwardly from base plate 16; engaging the first end of monopod 14 with the mounting assembly on optical device 12; positioning the curved blade 18 of base plate 16 against a person's torso; wrapping strap 40 around the back of the person's neck and/or shoulder; engaging the second end 14*a* of monopod 14 with the first engagement assembly 20; and supporting optical device 12 a distance above base plate 16.

The step of providing stabilizing assembly 10 with first engagement assembly 20 includes providing stabilizing assembly 10 with a socket 24 defined in base plate 16; and the step of engaging second end 14*a* of monopod 14 with the first engagement assembly 20 includes inserting second end 14*a* into he socket 24. The step of positioning blade 18 against the person's torso includes inserting a lower end 18*f* of blade 18 between a waistband 56 of a pair of pants or a skirt worn by the person and the person's torso; or inserting the lower end 18*f* of blade 18 between a belt 56 worn around the waist and the person's actual waistline.

The step of providing stabilizing assembly 10 further includes providing a second engagement member 22 on base plate 16 a distance from first engagement assembly 20; and the method further includes disengaging the first end of monopod 14 from the mounting assembly of optical device 12; and engaging the mounting assembly on optical device 12 with second engagement member 22. The method further comprises the steps of removing blade 18 from against the person's torso; removing strap 40 from around the person's neck and/or shoulder; resting a lower end 18*f* of blade 18 on a ground surface "S"; resting an adjustment assembly 36 or 48 provided on base plate 16 on the ground surface "S" a distance from lower end 18*f* of blade 18. The method may further include the steps of adjusting adjustment assembly 36 or 48 and thereby selectively raising or lowering part 16*d* of base plate 16 relative to the ground surface "S" to tilt or level the base plate relative to the ground surface "S".

The step of adjusting adjustment assembly 36 includes rotating a fastener 36 extending outwardly from an end of base plate 16 opposite from the blade 18 about a vertical axis "X" and in a first direction to raise the end 16*d* of base plate 16 relative to ground surface "S"; or rotating fastener 36 about the vertical axis "X" in a second direction to lower the end 16*d* of base plate 16 relative to ground surface "S".

The step of adjusting adjustment assembly 48 includes pivoting a leg 48 provided on an end 16*d* of the base plate 16 opposite from blade 18 about a horizontal axis in a first direction to move leg 48 out of alignment with base plate 16 (where guide wall 26 and base plate 16 are considered to be a unitary component); orienting leg 48 at an angle α relative to base plate 16; and adjusting angle α of leg 48 to raise or lower the end 16*d* of base plate 16 relative to the ground surface "S". The step of pivoting leg 48 is preceded by disengaging a locking mechanism and the step of adjusting the angle α of leg 48 is followed by re-engaging the locking mechanism.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A stabilizing assembly for an optical device comprising:
   a base plate;
   a blade engaged with the base plate and oriented at an angle relative to the base plate; wherein the blade is adapted to be held adjacent a person's body; and when the blade is held against the person's body, the base plate extends outwardly away from the person's body;
   a strap engaged with the base plate, said strap being adapted to pass around the person's neck or shoulder;
   a first engagement member provided on the base plate; said first engagement member being adapted to selectively engage an optical device with the base plate in a first orientation; and
   a second engagement member provided on the base plate a distance from the first engagement member and proximate the blade; and wherein the second engagement member is adapted to selectively engage the optical device to the base plate in a second orientation.

2. The stabilizing assembly as defined in claim 1, wherein the base plate has a first end and a second end and a longitudinal axis extending between the first and second ends; and wherein the blade is provided at the first end of the base plate and the first engagement member is provided proximate the second end.

3. The stabilizing assembly as defined in claim 1, wherein the blade is curved and is adapted to anatomically fit a person's waistline.

4. The stabilizing assembly as defined in claim 1, wherein the first engagement member comprises a socket defined in a first surface of the base plate; said socket being adapted to receive an end of a monopod therein where the monopod is engaged with the optical device.

5. The stabilizing assembly as defined in claim 1, wherein the base plate includes a first surface, a second surface, a first end, a second end, a first side and a second side; wherein the blade is provided at the first end of the base plate; and wherein the base plate defines a channel that extends between the first and second sides a distance from the blade; and wherein a portion of the strap is threaded through the channel.

6. The stabilizing assembly as defined in claim 1, wherein the second engagement member comprises a mounting screw that extends upwardly and outwardly from the base plate and is adapted to engage a mounting assembly provided on the optical device.

7. The stabilizing assembly as defined in claim 1, wherein the base plate includes a first surface and a second surface; and wherein the blade is oriented at right angles to the second surface of the base plate and extends for a distance beyond the second surface of the base plate.

8. The stabilizing assembly as defined in claim 2, wherein the strap engages the base plate at a location between the blade and the first engagement member.

9. The stabilizing assembly as defined in claim 2, wherein the base plate includes a first side and a second side that extend between the first and second ends; and wherein the base plate has a width at the first end where the width is measured between the first and second sides; and wherein the blade has a width that is greater than the width of the base plate.

10. A stabilizing assembly for an optical device comprising:
   a base plate including a blade adapted to be held adjacent a person's body;
   a strap engaged with the base plate, said strap being adapted to pass around the person's neck or shoulder; and
   a first engagement member provided on the base plate; said first engagement member being adapted to selectively engage an optical device with the base plate in a first orientation; wherein the first engagement member comprises a socket defined in a first surface of the base plate; said socket being adapted to receive an end of a monopod therein where the monopod is engaged with the optical device; and
   a guide wall extending upwardly away from the first surface of the base plate and located to at least partially surround the socket.

11. A stabilizing assembly for an optical device comprising:
   a base plate including a blade adapted to be held adjacent a person's body;
   a strap engaged with the base plate, said strap being adapted to pass around the person's neck or shoulder; and
   a first engagement member provided on the base plate; said first engagement member being adapted to selectively engage an optical device with the base plate in a first orientation; and
   wherein the base plate includes a first surface and an opposed second surface; wherein the blade is oriented generally at right angles to the first surface and extends for a distance below the second surface; and wherein the stabilizing assembly further comprises an adjustment assembly provided on the base plate a distance from the blade and wherein the adjustment assembly is selectively positionable to extend downwardly below the second surface of the base plate.

12. The stabilizing assembly as defined in claim 11, wherein the adjustment assembly comprises a threaded fastener having a shaft and a head; wherein the fastener extends outwardly from the second surface of the base plate and is selectively rotatable in a first direction or a second direction about an axis that extends along the shaft; and wherein rotation of the fastener in the first direction moves the head further from the second surface; and rotation of the fastener in the second direction moves the head toward the second surface.

13. The stabilizing assembly as defined in claim 11, wherein the adjustment assembly comprises a leg that is pivotally engaged with the base plate and is rotatable between a first position where the leg is substantially parallel to the base plate and a second position where the leg is oriented at an angle relative to the base plate.

14. The stabilizing assembly as defined in claim 11, wherein the blade has a bottom end and the bottom end includes a pair of spaced apart feet that, together with an end of the adjustment assembly, is adapted to hold the base plate a distance above a ground surface.

15. The stabilizing assembly as defined in claim 13, further comprising a locking mechanism operatively engaged with the leg; and wherein the locking mechanism is selectively operable to lock the leg at an angle relative to the base plate.

16. In combination:
   an optical device having a mounting assembly on a lower surface thereof;
   a monopod having a shaft with a first end and a second end; wherein the first end is engageable with the mounting assembly on the optical device;
   a stabilizing assembly comprising a base plate including a blade adapted to be held against a person's torso;
   a strap engaged with the base plate, said strap being adapted to pass around a back of the person's neck or their shoulder; and
   a first engagement member provided on the base plate; wherein the second end of the monopod is engageable with the first engagement member and the base plate supports the optical device when the monopod is so engaged; wherein the first engagement member comprises a socket defined in a first surface of the base plate; and wherein the socket is sized and shaped to be substantially complementary to an end of the monopod receivable therein; and
   wherein the base plate further includes a guide wall extending upwardly from the first surface of the base plate and the guide wall at least partially surrounds the socket.

17. In combination:
an optical device having a mounting assembly on a lower surface thereof;
a monopod having a shaft with a first end and a second end; wherein the first end is engageable with the mounting assembly on the optical device;
a stabilizing assembly comprising:
a base plate;
a blade engaged with the base plate and oriented at an angle relative to the base plate; wherein the blade is adapted to be held against a person's torso; and when the blade is held against the person's torso, the base plate extends outwardly away from the person's torso;
a strap engaged with the base plate, said strap being adapted to pass around a back of the person's neck or their shoulder;
a first engagement member provided on the base plate; wherein the second end of the monopod is engageable with the first engagement member and the base plate supports the optical device when the monopod is so engaged; and
a second engagement member provided on the base plate a distance from the first engagement member; and
wherein the mounting assembly on the optical device is selectively engageable with the second engagement member on the base plate when the first end of the monopod is disengaged from the mounting assembly on the optical device.

18. The combination as defined in claim 17, wherein the first engagement member comprises a socket defined in a first surface of the base plate; and wherein the socket is sized and shaped to be substantially complementary to an end of the monopod receivable therein.

19. A method of stabilizing an optical device that includes a mounting assembly thereon, said method comprising:
providing a monopod having a shaft with a first end and a second end;
providing a stabilizing assembly comprising a base plate and a curved blade engaged at one end with the base plate; and a first engagement assembly located a distance from the blade; and wherein a strap extends outwardly from the base plate;
engaging the first end of the monopod with the mounting assembly on the optical device;
positioning the curved blade of the base plate against a person's torso;
wrapping the strap around the back of the person's neck or shoulder;
engaging the second end of the monopod with the first engagement assembly; and
supporting the optical device a distance above the base plate; and
wherein the step of providing the stabilizing assembly further includes providing a second engagement member on the base plate a distance from the first engagement assembly; and the method further includes disengaging the first end of the monopod from the mounting assembly of the optical device; and engaging the mounting assembly on the optical device with the second engagement member on the base plate.

20. The method as defined in claim 19, wherein the step of providing the stabilizing assembly with the first engagement assembly includes providing the stabilizing assembly with a socket defined in the base plate; and the step of engaging the second end of the monopod with the first engagement assembly includes inserting the second end of the monopod into the socket.

21. The method as defined in claim 19, wherein the step of positioning the blade against the person's torso includes inserting a lower end of the blade between a waistband of a pair of pants or a skirt worn by the person and the person's torso; or inserting the lower end of the blade between a belt worn by the person and the person's torso.

22. The method as defined in claim 19, further comprising:
removing the blade from against the person's torso;
removing the strap from around the person's neck or shoulder;
resting a lower end of the blade on a ground surface;
resting an adjustment assembly provided on a lower surface of the stabilizing assembly on the ground surface a distance from the lower end of the blade.

23. The method as defined in claim 22, further comprising:
adjusting the adjustment assembly and thereby selectively raising or lowering the second region of the base plate relative to the ground surface to tilt or level the base plate relative to the ground surface.

24. The method as defined in claim 23, wherein the step of adjusting the adjustment assembly includes rotating a fastener extending outwardly from an end of the base plate opposite from the blade about a vertical axis and in a first direction to raise the end of the base plate relative to the ground surface; or rotating the fastener about the vertical axis in a second direction to lower the end of the base plate relative to the ground surface.

25. The method as defined in claim 23, wherein the step of adjusting the adjustment assembly includes:
pivoting a leg provided on an end of the stabilizing assembly opposite from the blade about a horizontal axis in a first direction to move the leg out of alignment with the end of the stabilizing assembly;
orienting the leg at an angle relative to the end of the stabilizing assembly;
adjusting the angle of the leg to raise or lower the end of the stabilizing assembly relative to the ground surface.

26. The method as defined in claim 23, wherein the step of pivoting the leg is preceded by disengaging a locking mechanism and the step of adjusting the angle of the leg is followed by re-engaging the locking mechanism.

* * * * *